(12) United States Patent
Davis et al.

(10) Patent No.: US 6,389,533 B1
(45) Date of Patent: May 14, 2002

(54) ANONYMITY SERVER (75) Inventors: Derek L. Davis, Phoenix; Jean-Charles Korta, Mesa, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/244,803

(22) Filed: Feb. 5, 1999

(51) Int. Cl.[7] .................................................. H04L 9/00
(52) U.S. Cl. ........................ 713/162; 713/153; 713/154; 713/151
(58) Field of Search ................................. 713/190, 151, 713/152, 153, 154, 162, 200

(56) References Cited

U.S. PATENT DOCUMENTS

| 5,473,692 A | 12/1995 | Davis |
| 5,539,828 A | 7/1996 | Davis |
| 5,568,552 A | 10/1996 | Davis |
| 5,751,809 A | 5/1998 | Davis et al. |
| 5,796,840 A | 8/1998 | Davis |
| 5,805,706 A | 9/1998 | Davis |
| 5,805,712 A | 9/1998 | Davis |
| 5,818,939 A | 10/1998 | Davis |
| 5,828,753 A | 10/1998 | Davis |
| 5,884,246 A | * 3/1999 | Boucher et al. ................ 704/2 |
| 5,961,593 A | * 10/1999 | Gabber et al. ............... 709/219 |
| 6,023,510 A | * 2/2000 | Epstein ......................... 705/54 |
| 6,061,789 A | * 5/2000 | Hauser et al. ............... 713/168 |
| 6,263,362 B1 | * 7/2001 | Donoho et al. ............. 709/207 |
| 6,266,704 B1 | * 7/2001 | Reed et al. .................. 709/238 |

FOREIGN PATENT DOCUMENTS

| JP | 411161574 A | * 6/1999 | ........... G06F/13/00 |

OTHER PUBLICATIONS

"Anonymous Remailer Information," anon.efga.org/Remailers[internet], 2001.*
Bacard, "Anonymous Remailer FAQ," www.andrebacard.com/remail.htm[internet], Feb. 2001.*
Dusse et al, "S/MIME Version 2 Message Specification," RFC 2311, Mar. 1998.*

* cited by examiner

Primary Examiner—Albert DeCady
Assistant Examiner—Steve Kabakoff
(74) Attorney, Agent, or Firm—Blakely, Sokoloff, Taylor & Zafman LLP (57) ABSTRACT An anonymity system including a cryptographic device. The cryptographic device of the anonymity system is adapted to initially determine whether a response to an incoming electronic message is requested. If so, an address of the anonymity system is encrypted with a key. In one embodiment, the key may be a public key of a system targeted to receive an outgoing electronic message from the anonymity system inclusive of data contained in the incoming electronic message. The encrypted address is placed into an outgoing electronic message before re-routing to the target system to allow the target system to re-route the response back to the anonymity system.

30 Claims, 9 Drawing Sheets

ANONYMITY SERVER

BACKGROUND

1. Field

The present invention relates to the field of communications. More particularly, the present invention relates to a system and method for maintaining anonymous and traffic analysis resistant communications over a communication link.

2. Related Art

Over the last few years, personal and commercial usage of the Internet has increased dramatically. As a result, companies are beginning to monitor such usage for a number of reasons. For example, marketing companies can analyze Internet traffic in order to develop consumer profiles of various users or to obtain information about ongoing projects by a competitive company.

In an attempt to thwart data collection through traffic analysis and provide message anonymity over public communication links like the Internet, anonymous remailers are now being provided. An "anonymous remailer" is a computer that receives an electronic message over a communication link from a sender and redirects that electronic message to an intended recipient. By encrypting audible and/or viewable data of the electronic message, the integrity and confidentiality of that data would be protected against unauthorized access by the operator of the anonymous remailer or an interloper.

It is evident that the above-described conventional communication scheme would substantially ensure the preservation of the integrity and confidentiality of data within an electronic message. However, this conventional communication scheme fails to protect the integrity or confidentiality of data transmitted back to the original sender in the form of a response from the intended recipient.

In certain situations, anonymous remailers have been configured to assign a unique tag to each original sender of an electronic message before the electronic message is redirected to the intended recipient. This tag is used as a secret key by the intended recipient to encrypt data contained in a response to the electronic message. However, to support this communication scheme, the anonymous remailer would have to decrypt the response with the tag and re-encrypt the response with the public key of the original sender because the intended recipient would have no knowledge of the original sender, namely a public key of the original sender. Since the operator responsible for the anonymous remailer would have access to the return path of the response, reliance on the integrity of that operator is required. Clearly, this substantially reduces the level of security of this communication scheme.

Therefore, it would be desirable to create an electronic system and a corresponding method for maintaining anonymous and traffic analysis resistant communications over a communication link without dependence on the integrity of the system operator.

SUMMARY

In one embodiment, the present invention relates a cryptographic device comprising a memory and a processor. The memory is used to contain at least one key. The processor includes circuitry to determine whether a response to an incoming electronic message is requested. The circuitry further encrypts an address of a system associated with the cryptographic device with the key when the response is requested, and assists in placing the encrypted address into an outgoing electronic message before transmission.

BRIEF DESCRIPTION OF THE DRAWINGS

The features and advantages of the present invention will become apparent from the following detailed description of the present invention in which.

DETAILED DESCRIPTION OF AN EMBODIMENT

The present invention relates to a system and method for providing anonymous and traffic analysis resistant communications over a communication link in order to preserve the integrity and confidentiality of an electronic message transmitted between two electronic systems. In the following description, numerous details of selected embodiments of the invention are set forth in order to provide a thorough understanding of the present invention. It will be obvious, however, to one skilled in the art that other embodiments may be utilized while still practicing the present invention.

In the detailed description, certain terminology is used to generally describe features and characteristics of the present invention. For example, "information" includes data, address, control signals or any combination thereof. An "electronic message" is one or more packets of digital information which collectively comprise: (i) a header featuring an address of the immediate destination of the electronic message, and (ii) a body featuring data, addresses to identify the intended recipient of the electronic message and selected control information. A "key" is an encoding and/or decoding parameter such as, for example, public or private keys used by well-known or later established asymmetric key cryptographic functions or a secret key shared in confidence between the two electronic systems executing a well-known or later established symmetric key cryptographic function.

A "digital signature" is digital information encrypted with a private key of its signatory to ensure that the information has not been illicitly modified after being digitally signed.

As a result, a digital signature authenticates the integrity of digital information provided in its entirety or as a digest produced by a one-way hash function. A "one-way hash function" includes a function, mathematical or otherwise, that takes information of a variable-length and converts it into a fixed-length result (referred to as a "digest"). The term "one-way" indicates that there does not readily exist an inverse function to recover any discernible portion of the original information from the digest. A "digital certificate" is defined herein as digital information used to authenticate a sender of information. For example, a digital certificate may include a public key, associated with an electronic system or entity (person, company, etc.) being certified, which is encrypted with the private key of a certification authority. Examples of a "certification authority" includes a manufacturer, a trade association, a governmental entity, a bank or any other entity held in trust by the consumer.

Figure 1:
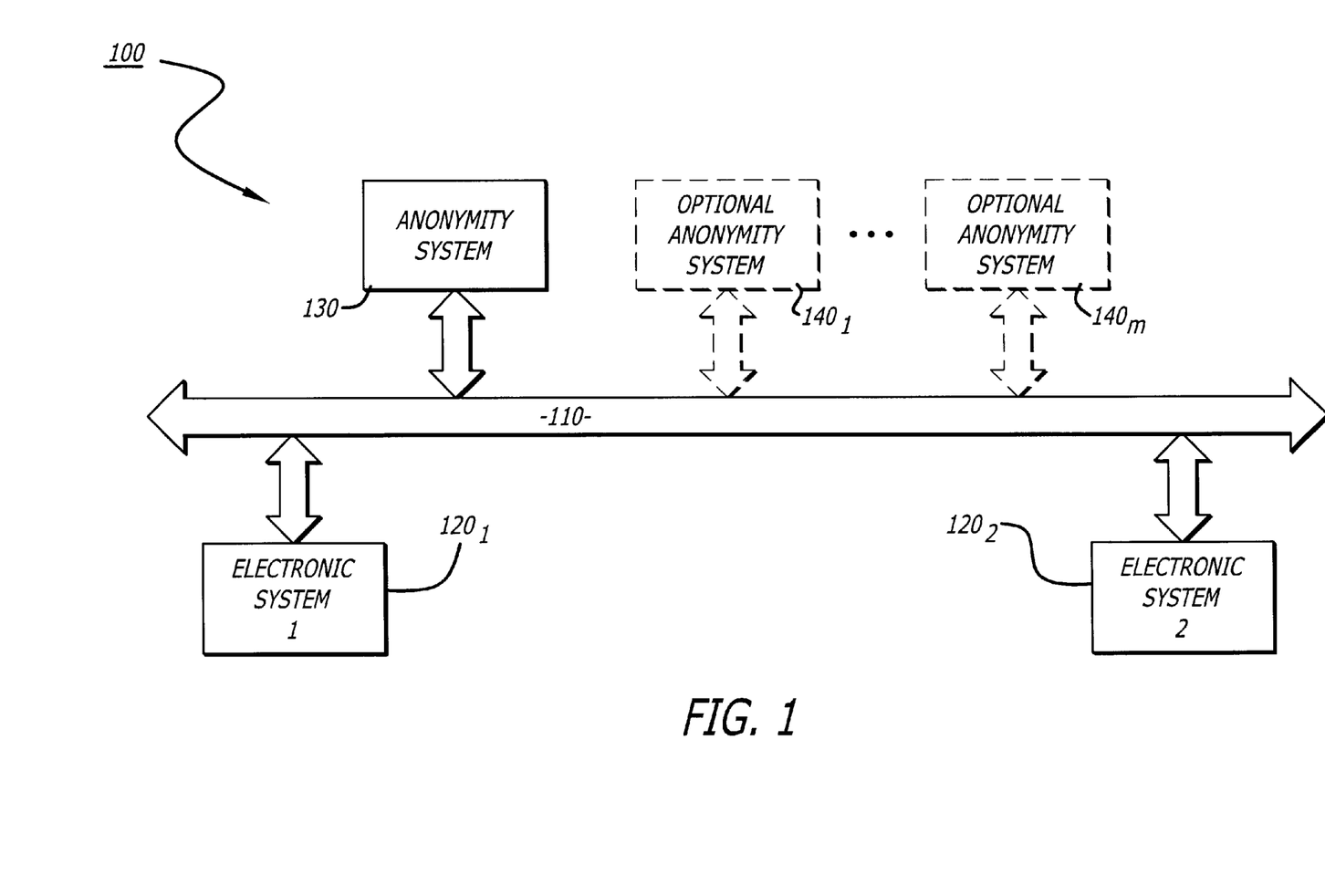
FIG. 1 is a diagram of an illustrative embodiment of a communication system utilizing the present invention.

Referring to FIG. 1, a diagram of an illustrative embodiment of a communication system featuring the present invention is shown. The communication system 100 comprises a communication link 110 connecting a plurality of electronic systems $120_1$–$120_n$ ("n" being a positive whole number; n=2) and at least one anonymity system 130. Optionally, as represented by dashed lines, other anonymity system(s) $140_1$–$140_m$ ("m" being a positive whole number) may be coupled to communication link 110 so that an electronic message may be passed through multiple anonymity systems as described in FIGS. 6–9.

As shown in FIG. 1, communication link 110 provides bi-directional communications between (i) two electronic systems $120_1$ and $120_2$, (ii) an electronic system and an anonymity system, and/or (iii) two anonymity systems. The bi-directional communications may be accomplished through one or more communication channels. Various embodiments of communication link 110 may include, but are not limited or restricted to a public network including a Wide Area Network (WAN) such as the Internet, a private network such as a Local Area Network (LAN), wireless, Plain Old Telephone System (POTS), cable and Integrated Services Digital Network (ISDN) as defined by the International Telegraph and Telephone Consultative Committee and the like.

Each of the electronic systems $120_1$ and $120_2$ include a computer (e.g., portable, desktop, server, mainframe, network computer, etc.) or any other equipment accessible to communication link 110. Examples of the "other equipment" include, for example, a network television, a network printer, a telephone, a personal digital assistant and the like. In this embodiment, each electronic system $120_1$ or $120_2$ is uniquely addressed on communication link 110.

Figure 2:
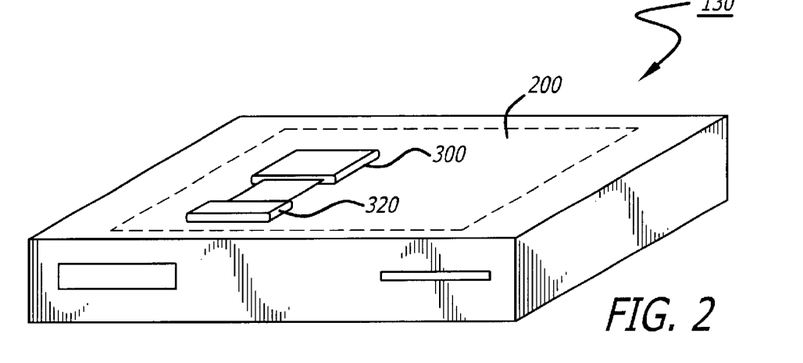
FIG. 2 is a diagram of an illustrative embodiment of an anonymity system of the communication system of FIG. 1.

Referring now to FIG. 2, a diagram of an illustrative embodiment of anonymity system 130 implemented as a server is shown. Coupled to electronic systems $120_1$ and $120_2$ as described above, anonymity system 130 includes a system substrate 200, outlined by dashed lines, which controls the overall functionality of anonymity system 130. System substrate 200, normally a circuit board (e.g., a motherboard) formed with any type of material or combination of materials upon which logic devices can be attached.

Figure 3:
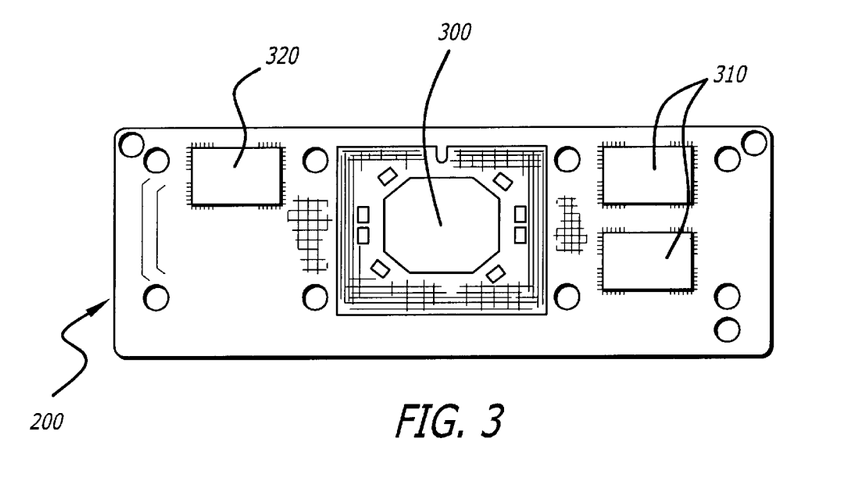
FIG. 3 is a diagram of an illustrative embodiment of a cryptographic device coupled to a system substrate of the anonymity system of FIG. 2.

As shown in FIG. 3, system substrate 200 comprises at least one processor 300 and a cryptographic device 320. To enable communications with processor 300, cryptographic device 320 may be coupled to any bus architecture to which processor 300 communicates (e.g., a dedicated bus, an input/output "I/O" bus such as a Peripheral Component Interconnect "PCI" bus, etc.). Alternatively, cryptographic device 320 may be integrated within the same package as processor 300, either on a separate die or on the same die as processor 300. Although not shown, discrete components (e.g., capacitors, resistors, inductors, etc.) are attached to system substrate 200 in a selected manner to, among other things, maximize routing characteristics and decrease latency between integrated circuitry.

Figure 4:
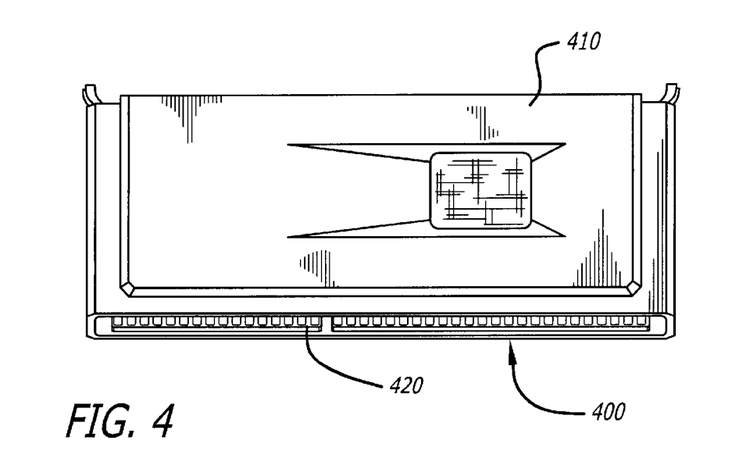
FIG. 4 is a diagram of an alternative embodiment using a removable daughter card to interconnect the cryptographic device to the system of FIGS. 2 and 3.

Referring now to FIG. 4, an alternative embodiment of an implementation associated with cryptographic device 320 is shown. Cryptographic device 320 is coupled to a removable daughter card 400 electrically and mechanically coupled to system substrate 200 of FIGS. 2 and 3. In this embodiment, daughter card 400 includes a circuit board formed from any type of material upon which integrated circuitry (not shown) can be attached through well-known techniques such as soldering. A casing 410 substantially covers daughter card 400 in order to protect its integrated circuitry from damage or harmful contaminants. The daughter card 400 includes a connector 420 to establish the mechanical and an electrical connection with a connector of system substrate 200. In this embodiment, connector 420 includes a standard male edge connector. It is contemplated, however, that other embodiments of daughter card 400 include a removable card having a credit card format (e.g., a SmartCard), a PCMCIA card, a network interface card and the like.

Figure 5:
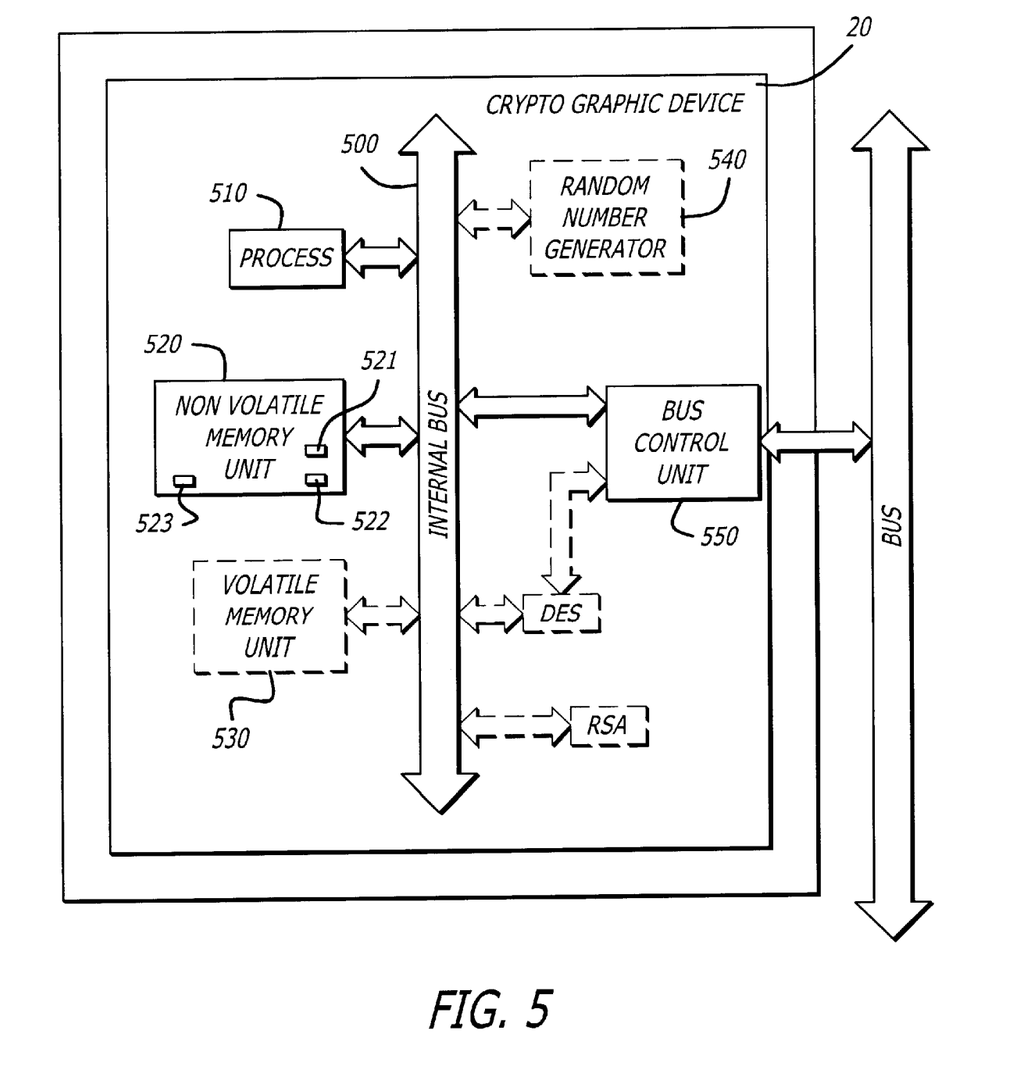
FIG. 5 is a diagram of an illustrative embodiment of a cryptographic device implemented within the anonymity system of FIG. 2.
Figure 6:
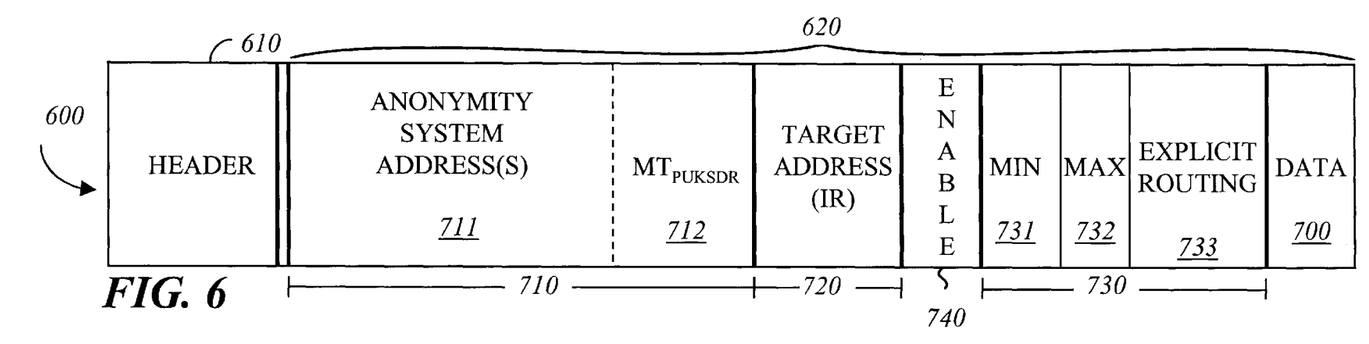
FIGS. 6–9 are diagrams of illustrative embodiments for a selected format of an incoming electronic message transmitted between electronic systems and/or multiple anonymity systems.

Referring to FIG. 5, a diagram of one embodiment of cryptographic device 320 is shown. Cryptographic device 320 comprises an internal bus 500 coupling together a processor 510, non-volatile memory unit 520, an optional volatile memory unit 530 (as denoted by dashed lines), an optional random number generator 540 (as denoted by dashed lines) and a bus control unit 550. The bus control unit 550 controls information transmissions between cryptographic device 320 and communication link 10 of FIG. 1, thereby maintaining communications with any one of the "n" electronic systems remotely located from anonymity system 130.

In this embodiment, non-volatile memory unit 520 contains a public/private key pair 521 and 522 uniquely associated with cryptographic device 320. It is contemplated that non-volatile memory unit 520 further contains software 523, namely communication software and/or software to counter (resist) traffic analysis. When in operation, communication software allows electronic systems to transfer data while counter traffic analysis software performs operations making traffic analysis more difficult. For example, the counter traffic analysis software, when executed, may introduce padding into the electronic message to increase its size. Likewise, the counter traffic analysis software may (i) introduce an arbitrary delay before redirecting that electronic message, (ii) partition the electronic message into multiple messages which are transmitted in succession, and/or (iii) produce decoy (invalid) messages along with the redirected electronic message or any combination thereof. Of course, other techniques may be used. Of course, it is contemplated that software 523 may be stored outside cryptographic device 320, provided this software is cryptographically protected to avoid modification before being loaded into non-volatile memory unit 520 or volatile memory unit 530 of cryptographic device 320.

Volatile memory unit 530 may be utilized as temporary storage by processor 510, especially during the execution of software 523. The random number generator 540 may be used in the initial generation of values used to produce public key 521 and private key 522 contained in non-volatile memory unit 520. It is desirable to implement random number generator 540 into cryptographic device 320 to guarantee that a private key of a unique public/private key pair will not been exposed in readable form outside cryptographic device 320. Also, the cryptographic engine hardware represented by a symmetric (e.g., DES-based) and an asymmetric (e.g., RSA-based) encryption/decryption units may be optionally implemented, as indicated by dashed lines, to assist in performing cryptographic operations.

It is contemplated, however, that cryptographic device 320 of FIG. 4 may be implemented in a number of alternative embodiments. For example, the cryptographic device may be implemented with discrete logic on a printed circuit board, or implemented within a chipset operating in cooperation with a host processor, or implemented within the processor, or implemented as a separate device coupled to a bus accessible by the processor. There exist many embodiments which, although slightly different in design, do not deviate from the spirit and scope of the invention.

Figure 7:
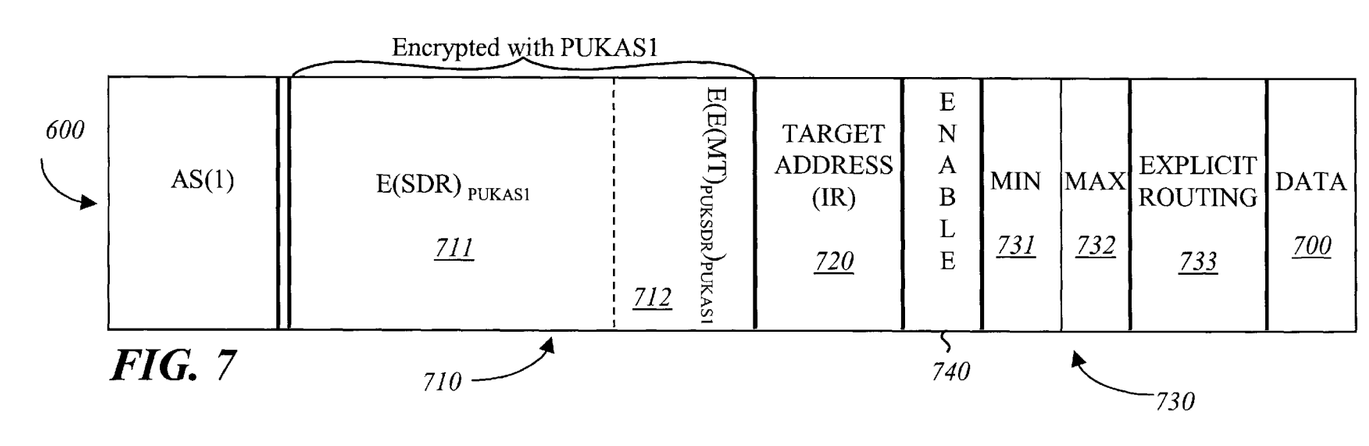
Figure 8:
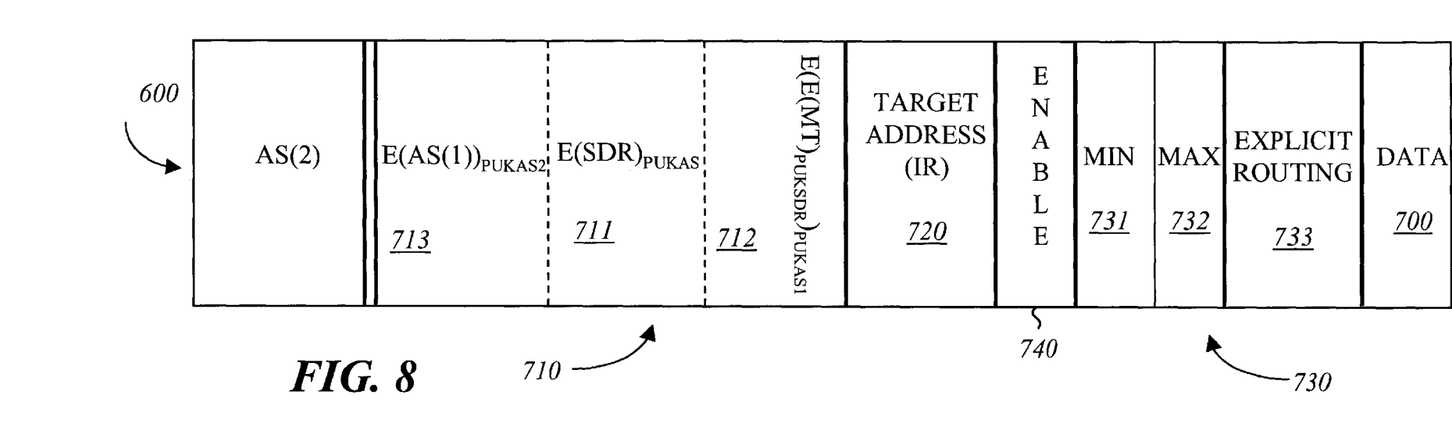
Figure 9:
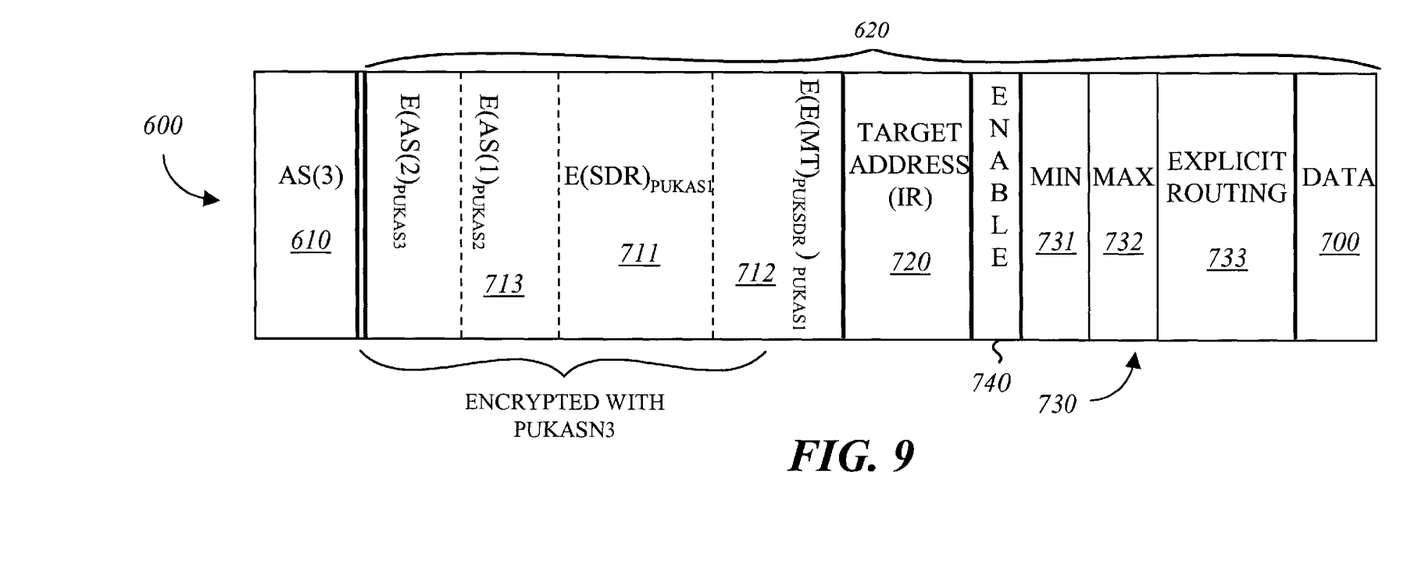

Referring to FIGS. 6–9, a general format of the data structures of an electronic message transmitted between two electronic systems and through one or more anonymity systems is shown. Each electronic message 600 includes a header 610 and a message body 620. The header 610 includes an immediate destination address of electronic message 600. Initially, this destination address is a unique address associated with a first anonymity system (identified as "AS(1)") as shown in FIG. 7. For subsequent routing, the destination address may be a unique address associated with another anonymity system (e.g., AS(x), where "x"=2) or the intended recipient (IR) such as a second electronic system 120$_2$ of FIG. 1.

The message body 620 includes data 700 such as a viewable image, text, an audible sound, an executable program and the like. Optionally, data 700 is encrypted with a public key of the intended recipient (PUKIR). Besides data 700, body 620 may further include (i) a message propagation field 710, (ii) a target address field 720, (iii) a routing field 730, (iv) a control field 740 and perhaps (v) padding information which is interspersed in body 620 or appended to data 700 or predetermined field 710, 720, 730 or 740. The optional padding is not shown.

In this embodiment, control field 740 includes a communication path enable bit which, when set, indicates to communication software, executed by the cryptographic device of an anonymity system, that message propagation field 710 can be loaded with information as described below. This allows a response to be routed back to the original sender of electronic message 600. Otherwise, electronic message 600 cannot be responded to by the intended recipient.

When the enable bit is set, message propagation field 710 is loaded with data to identify provider(s) of electronic message 600; namely, in this embodiment, the address(es) 711 of those anonymity system(s) through which electronic message 600 has been routed. Successive loading of message propagation field 710 is described below and is illustrated in FIGS. 7–10. In addition, message propagation field 710 is loaded with data acting as a tag identification value for the electronic message (referred to as a "message tag" 712). Herein, message tag (MT) 712 is encrypted with the public key of the original sender (PUKSDR) as represented by "MT$_{PUKSDR}$".

The contents of message propagation field 710, which are used in identifying where a response is directed to and what the response pertains to, are initially encrypted with the public key of a targeted anonymity system or electronic system. For example, message propagation field 710 includes an address of the original sender (SDR) and MT$_{PUKSDR}$, both encrypted with a public key of AS(1) (e.g., PUKAS1) when routed to a first anonymity system (FIG. 7). Subsequently, message propagation field 710 successively includes (i) an address of AS(1) encrypted with a public key of AS(2) (e.g., PUKAS2) when routed to a second anonymity system (FIG. 8), (ii) an address of AS(2) encrypted with a public key of AS(3) (e.g., PUKAS3) when routed to a third anonymity system, and (iii) an address of AS(M) encrypted with PUKIR when routed to the intended recipient (IR) such as another electronic system. "M" represents the m$^{th}$ anonymity system being the last system prior to routing the intended recipient.

Figure 10:
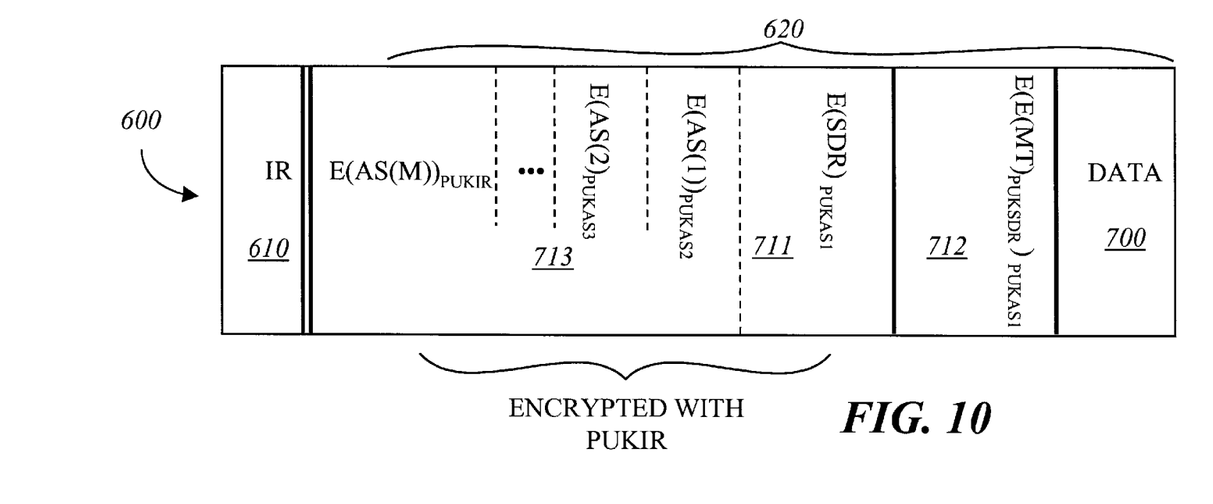
FIGS. 10–13 are diagrams of illustrative embodiments for a format of a response message returned to an electronic system from which the incoming electronic message of FIGS. 6–9 originated.

As further shown in FIGS. 6–9, target address field 720 contains an address of the intended recipient (IR) of electronic message 600 (such as the address of second electronic system 120$_2$ of FIG. 1 in this embodiment). The routing field 730 includes one or more bytes of information to indicate when to route electronic message 600 to the intended recipient. For example, in one embodiment, routing field 730 includes a maximum (max) number and minimum (min) number of intermediary anonymity systems for re-routing electronic message 600 (where min$\leq$M$\leq$max). The "minimum number" 731 is decremented upon receipt by each of the anonymity system(s) and, upon reaching zero, enables the anonymity system to route electronic message 600 to the intended recipient. The "maximum number" 732 is decremented upon receipt by each of the anonymity system(s) and, if reaches zero, forces that anonymity system to route electronic message 600 to the intended recipient. The routing field 730 may further include explicit routing information 733 that allows specified routing to occur. Otherwise, routing will be dependent on the configuration of each anonymity system. The information contained in target address field 720 and routing field 730 is deleted by the mth anonymity system addressed by AS(M) before transmission to the intended recipient as shown in FIG. 10.

Figure 11:
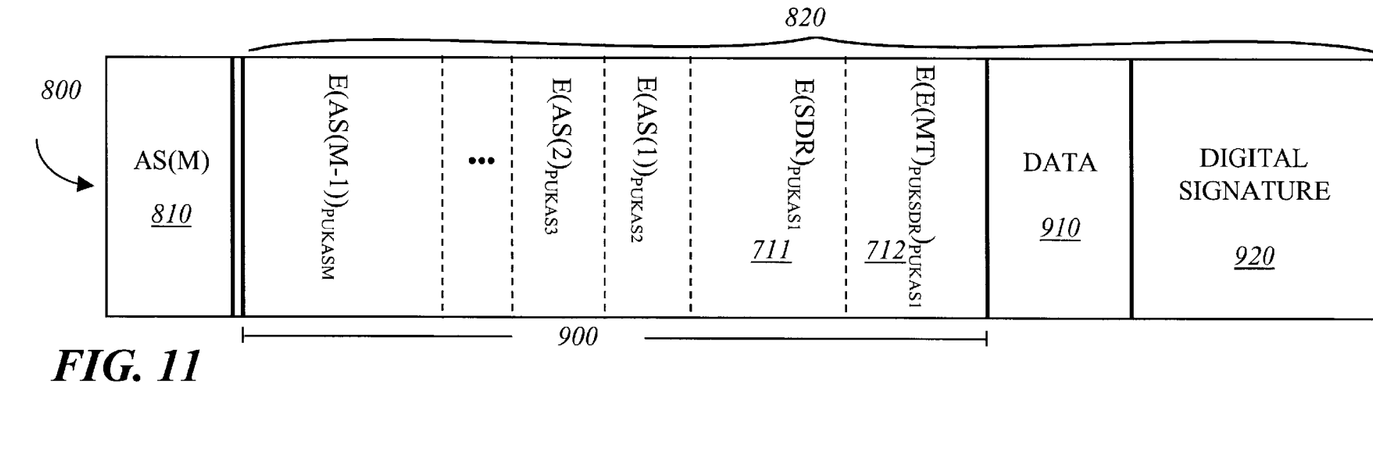

Referring now to FIG. 11, upon responding to electronic message 600, a second electronic system decrypts a portion of message propagation field 710 (see FIG. 10) to recover an address of the immediately preceding anonymity system, such as AS(M), which had routed the electronic message thereto. The data may need decryption as well. In general, a response 800 having the same general format as the electronic message may be generated by the second electronic system. The response 800 comprises a header 810 to contain the address of the immediate destination of response 800, for example AS(M), from the message propagation field of the electronic message 600 of FIG. 10. The response 800 further comprises a body 820 featuring a return message propagation field 900, data 910 as an optional digital signature 920. Return message propagation field 900 includes the contents of message propagation field 710 of FIG. 10 which were provided to the second electronic system. Certain contents would be encrypted with the public key of the mth anonymity system (e.g., PUKASM), such as the address AS(M-1) of the next intermediary system to receive response 800. The optional digital signature 920 provides assurances to the original sender that the intended recipient is, in fact, responding to the electronic message.

Figure 12:
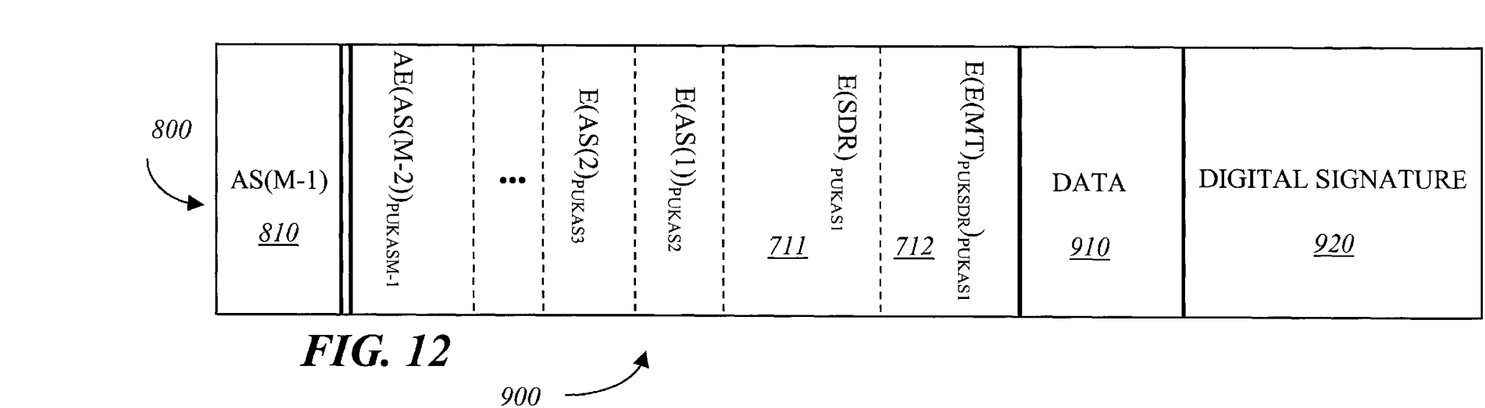

After being received by each of the anonymity systems, the contents of message propagation field 900 are decrypted and the most significant address, namely AS(M-1) is placed into header 810 as shown in FIG. 12. Now, the most significant address of message propagation field 900 is encrypted with the public key associated with the M-1$^{th}$ anonymity system (e.g., PUKASM-1). This process continues until response 800 is received by the first anonymity system addressed by AS(1).

Figure 13:
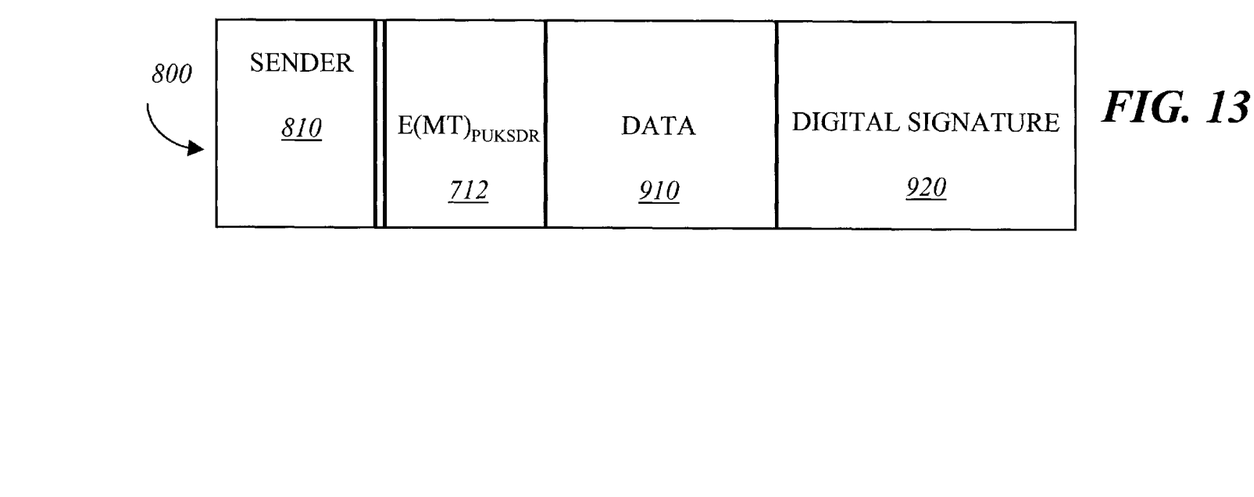

Upon reaching the first anonymity system, prior to transmission to the original sender, header 810 features an address of the original sender (e.g., SDR) to which the response was intended. Message 800 also includes message propagation field 900 having the encrypted message tag "E(MT)$_{PUKSDR}$" provided in the original message 600 and data 910. E(MT)$_{PUKSDR}$, when decrypted, identifies what the response pertains to (see FIG. 13). Data 910 may be encrypted with PUKSDR. As an option, digital signature 920 may be provided to the original sender to verify that response 800 originated from the intended recipient of electronic message 600.

Figure 14:
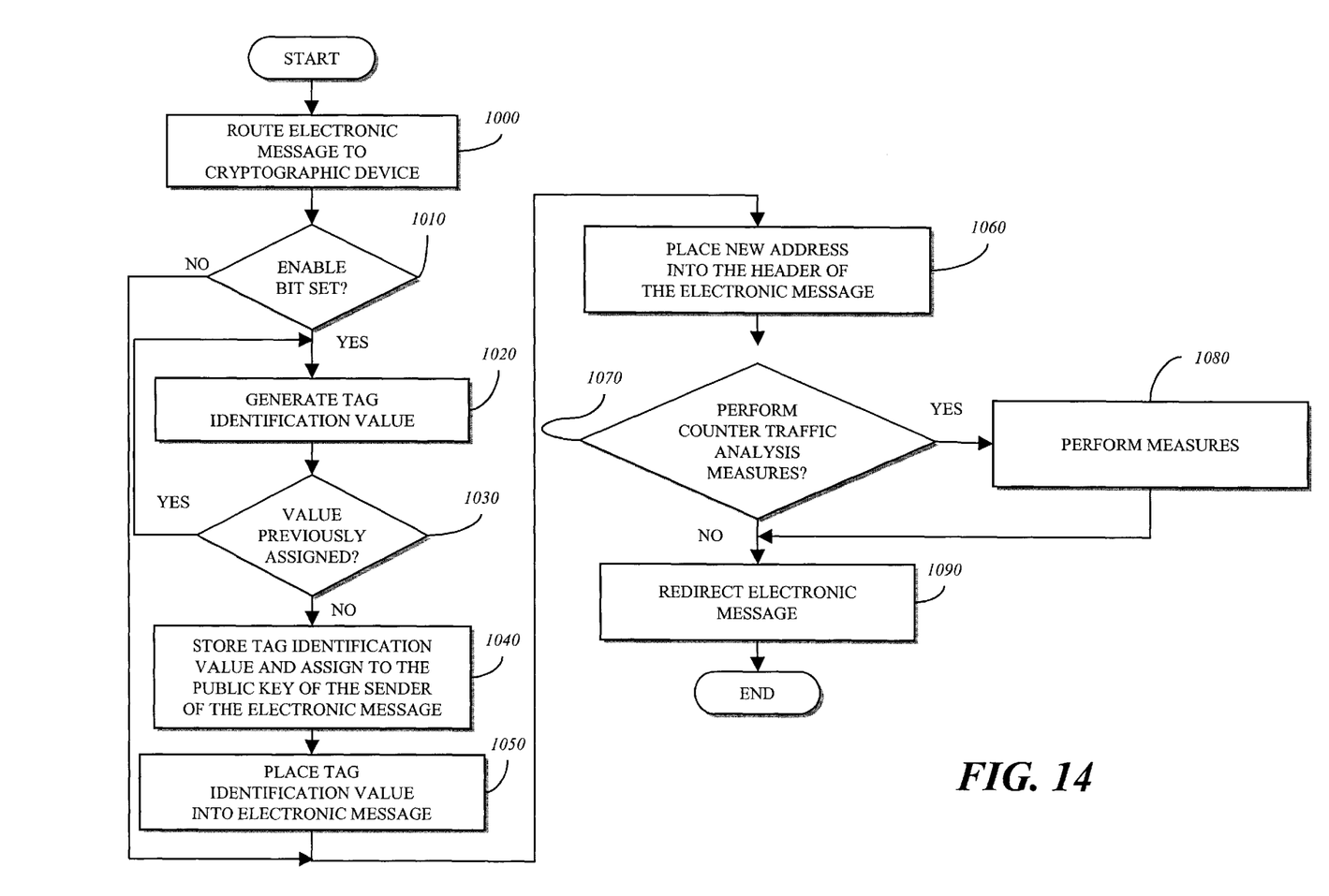
FIG. 14 is a flowchart of operations performed by an embodiment of the anonymity system of FIG. 2.

Referring now to FIG. 14, one embodiment of an address assignment scheme would involve the anonymity system routing an electronic message to the cryptographic device (block 1000). Internally within the cryptographic device, a determination is made as to whether the communication path enable bit has been enabled (block 1010). If this bit has been disabled, the address assignment scheme is discontinued. Instead, a new address (e.g., address of intended recipient) is placed in the header, perhaps counter traffic analysis procedures are performed, and the electronic message is redirected (blocks 1060, 1070, 1080 and 1090).

If this bit is enabled, a message tag (MT) is generated and determined whether the message tag has already been assigned (block 1020). If previously assigned, the message tag is again generated (block 1030) and checked. Otherwise, the message tag is stored in a table to correspond with the public key of the sender (PUKSDR) which is supplied by the electronic message (block 1040). Both the message tag and the address of a target anonymity system to receive this message are encrypted with a public key of the targeted anonymity system (block 10500. The encrypted message tag and address are placed in the electronic message (block 1060) prior to reconfiguration of the header for redirection from the anonymity system (block 1090).

If counter traffic analysis measures are desirable (block 1070), these measures may be employed internally within the cryptographic device (block 1080). For example, the cryptographic device may provide padding to the electronic message in order to vary its size. Alternatively or in combination therewith, a random delay before redirecting the electronic message may be induced. As a result, the decrypted data is not exposed to the operator. Instead, random counter traffic analysis measures are performed to make it difficult for somebody to look at incoming messages and to accurately deduce certain output messages are associated with corresponding incoming messages.

Figure 15:
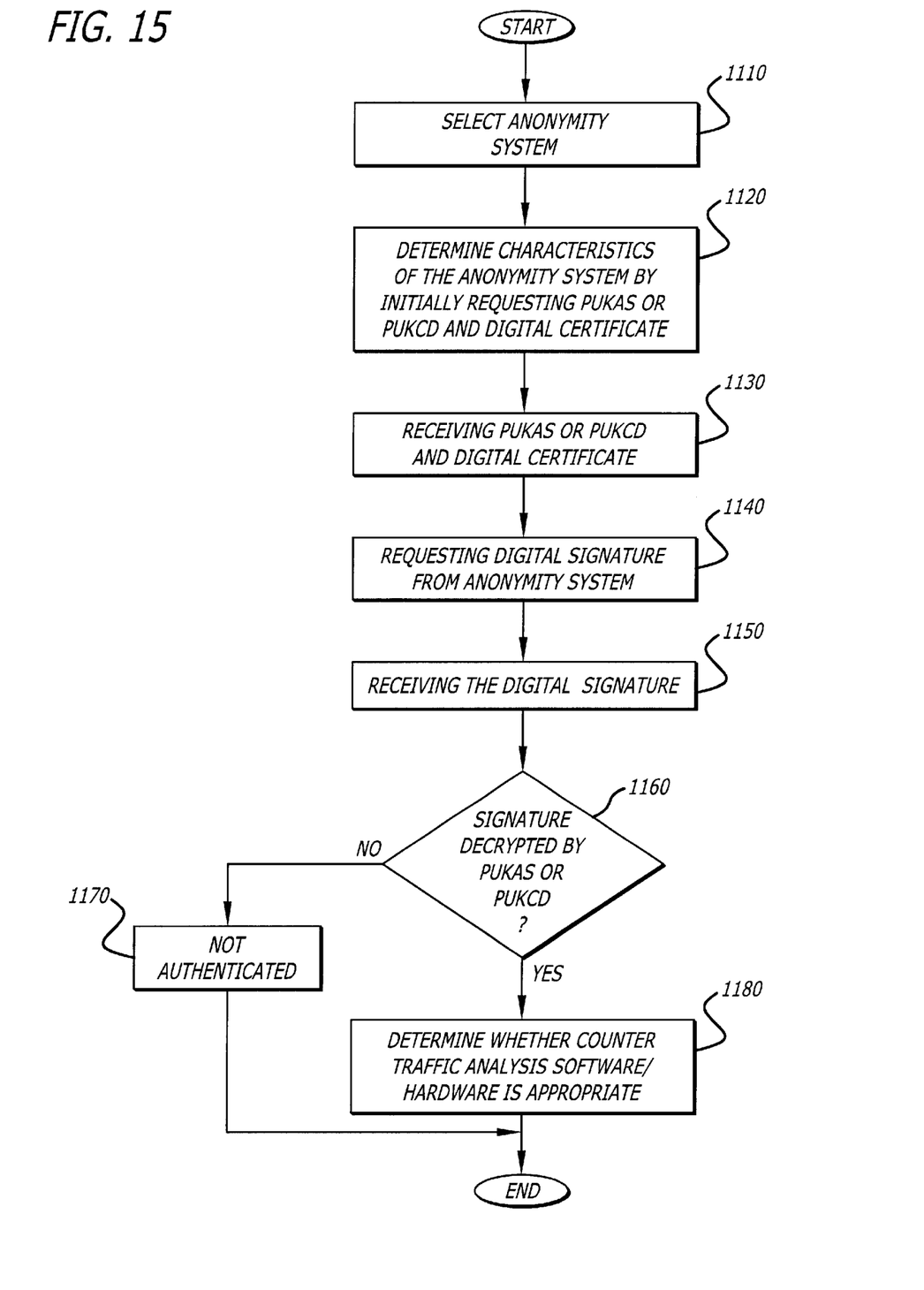
FIG. 15 is a flowchart of the authentication operations of an embodiment of the anonymity system of FIG. 2.

Referring now to FIG. 15, authentication of an anonymity system of FIG. 1 is shown. First, in block 1110, a sender tentatively selects a particular anonymity system. Upon selecting an anonymity system, the sender determines whether the characteristics of the anonymity system such as its operational protocol (block 1120). This may be accomplished through a number of authentication procedures.

As shown, one authentication procedure involves at least one of the parties requesting the public key of either the anonymity system (PUKAS) or the cryptographic device "PUKCD" and perhaps a digital certificate (block 1130). The digital certificate would verify that the anonymity system was manufactured by a certain company or perhaps approved by a certification authority such as a reputable manufacturer, trade association, governmental entity and the like. The digital certificate and perhaps the public key are encrypted with a private key of the certificate authority (PRKCA) whose public key (PUKCA) is widely disseminated. Thus, the parties can obtain PUKAS (or PUKCD) and send a challenge message to the anonymity system requesting a response to the message, this requested response being the message encrypted with the private key of the anonymity system (PRKAS) or private key of cryptographic device (PRKCD), respectively (block 1140). In block 1150, if the party can read the response by decrypting it with PUKAS (or PUKCD), the anonymity system has been authenticated to be the device that the parties have sought (blocks 1160 and 1170).

If the cryptographic device is configured to maintain counter traffic analysis software and/or firmware, an additional authentication operation may be performed to ensure that an acceptable version of such software/firmware is installed (block 1180). This authentication operation consists of querying the previously authenticated cryptographic device for details of its configuration.

The present invention described herein may be designed in accordance with many different methods and using many other embodiments that may come to mind to a person skilled in the art, without that person departing from the spirit and scope of the present invention. The invention should, therefore, be measured in terms of the claims which follows.

What is claimed is:

1. A cryptographic device comprising:
a memory to contain at least one key; and
a processor including circuitry to determine whether a response to an incoming electronic message is requested, to encrypt an address of a system associated with the cryptographic device with the key when the response is requested, and to place the encrypted address into an outgoing electronic message before transmission.

2. The cryptographic device of claim 1, wherein the memory is non-volatile.

3. The cryptographic device of claim 1, wherein the memory further comprises cryptographic software to decrypt at least one field of the incoming electronic message and to encrypt the address before being loaded into a field, the outgoing electronic message corresponding to the at least one field.

4. The cryptographic device of claim 1, wherein the memory further comprises software to counter traffic analysis by providing padding information to the outgoing electronic message.

5. The cryptographic device of claim 1, wherein the memory further comprises software to counter traffic analysis by providing an arbitrary delay before redirecting the outgoing electronic message.

6. The cryptographic device of claim 1, wherein the memory further comprises software to counter traffic analysis by partitioning the outgoing electronic message into multiple messages transmitted in succession.

7. The cryptographic device of claim 1 further comprising a random number generator operating in cooperation with the processor and the non-volatile memory.

8. The cryptographic device of claim 1, wherein the incoming electronic message includes a header and a body, the body including data targeted for an intended recipient.

9. The cryptographic device of claim 8, wherein the data of the incoming electronic message is encrypted with the public key of the intended recipient.

10. The cryptographic device of claim 8, wherein the body of the incoming electronic message further includes a message propagation field comprising:

a first field including information to identify an original sender of the incoming electronic message; and a second field to contain an address of each intermediary system through which at least a portion of the incoming electronic message is routed.

11. The cryptographic device of claim 10, wherein the second field of the message propagation field is chronologically ordered with a most recent intermediary system placed in the most significant bytes of the second field.

12. The cryptographic device of claim 10 further comprising a third field including a signal value to identify what message the response pertains to.

13. The cryptographic device of claim 12 further comprising a fourth field to identify an intended recipient of the incoming electronic message.

14. An anonymity system comprising:

a system substrate; and a daughter card coupled to the system substrate, the daughter card including a cryptographic device (i) to analyze an incoming electronic message to determine whether or not a response to the incoming electronic message is requested, (ii) to encrypt an address of the anonymity system with a key associated with a system to receive an outgoing electronic message from the cryptographic device, and (iii) to place the encrypted address into the outgoing electronic message before transmission.

15. The anonymity system of claim 14, wherein the system substrate comprising a host processor.

16. The anonymity system of claim 14, wherein the cryptographic device of the daughter card comprises a processor and a non-volatile memory to contain at least a public key and a private key associated with the anonymity system.

17. The anonymity system of claim 16, wherein the non-volatile memory of the cryptographic device further comprises software to produce the outgoing electronic message.

18. The anonymity system of claim 14, wherein the incoming electronic message includes a header and a body, the body of the incoming electronic message including a message propagation field.

19. The anonymity system of claim 18, wherein the message propagation field comprises data to identify an original sender of the incoming electronic message; and an address for each prior anonymity system through which the incoming electronic message has already been routed.

20. The anonymity system of claim 19, wherein the addresses being chronologically ordered within the message propagation field with an address of a most recent anonymity system is placed in a most significant bytes of the message propagation field.

21. The anonymity system of claim 18, wherein the body of the incoming electronic message further includes a target address field, a routing field and a control field.

22. The anonymity system of claim 21, wherein the target address field includes an address of a final, intended recipient of the incoming electronic message.

23. The anonymity system of claim 21, wherein the routing field includes control data to indicate when the outgoing electronic message is routed to a final, intended recipient.

24. The anonymity system of claim 21, wherein the control field includes an enable bit that, when set, indicates that the response is requested.

25. An article comprising a machine readable medium having instructions stored therein which, when executed, cause a computer to:

determine a state of at least one bit of an incoming electronic message, the at least one bit indicating whether a response message is permitted for the incoming electronic message;

encrypt an address of the anonymity system with a public key of a system targeted to receive an outgoing electronic message being based on the incoming electronic message; and a routine to load the encrypted address into the outgoing electronic message before transmission.

26. The article of claim 25, wherein the incoming electronic message comprises a header and a body, the body of the incoming electronic message including a message propagation field.

27. The article of claim 26, wherein the message propagation field includes information to provide an encrypted return path for the response message.

28. The article of claim 25, wherein the body of the incoming electronic message further comprises a control field having the at least one bit that, when set, indicates that the response message is permitted.

29. The article of claim 25, wherein the body of the incoming electronic message comprises a target address field including an address of an intended recipient of the incoming electronic message.

30. An anonymity system comprising:

a circuit board; and a cryptographic device coupled to the circuit board, the cryptographic device to decrypt at least one field of an incoming electronic message, to determine whether a response message to the incoming electronic message is requested by an original sender, and to place an address of the anonymity system having an encrypted format into an outgoing electronic message before transmission.

\* \* \* \* \*

UNITED STATES PATENT AND TRADEMARK OFFICE
CERTIFICATE OF CORRECTION

PATENT NO. : 6,389,533 B1  
DATED : May 14, 2002  
INVENTOR(S) : Davis et al.

It is certified that error appears in the above-identified patent and that said Letters Patent is hereby corrected as shown below:

<u>Column 4,</u>
Line 35, delete "10", insert -- 110 --.

Signed and Sealed this

Seventeenth Day of September, 2002

*Attest:*

*Attesting Officer*

JAMES E. ROGAN
*Director of the United States Patent and Trademark Office*